United States Patent [19]

Iwaki et al.

[11] Patent Number: 4,482,830

[45] Date of Patent: Nov. 13, 1984

[54] ELECTRIC GENERATOR FOR VEHICLE

[75] Inventors: Yoshiyuki Iwaki; Akio Matsumoto, both of Hyogo, Japan

[73] Assignee: Mitsubishi Denki Kabushiki Kaisha, Tokyo, Japan

[21] Appl. No.: 491,969

[22] PCT Filed: Aug. 26, 1982

[86] PCT No.: PCT/JP82/00340

§ 371 Date: Apr. 7, 1983

§ 102(e) Date: Apr. 7, 1983

[87] PCT Pub. No.: WO83/00955

PCT Pub. Date: Mar. 17, 1983

[30] Foreign Application Priority Data

Aug. 28, 1981 [JP] Japan .................... 56-136470
Aug. 31, 1981 [JP] Japan .................... 56-137335
Aug. 31, 1981 [JP] Japan .................... 56-137336

[51] Int. Cl.³ .................... H02K 9/06; H02K 47/24
[52] U.S. Cl. .................... 310/113; 310/60 R; 310/68 D
[58] Field of Search ............ 310/63, 102, 112, 114, 310/68 D, 68 R, 112, 113, 114

[56] References Cited

U.S. PATENT DOCUMENTS 2,586,452  2/1952  Aske .................... 310/112
2,613,240  10/1952  Robinson .................... 310/63
2,827,855  3/1958  Rankin .................... 310/63
3,142,772  7/1964  Jones .................... 310/63
3,586,938  6/1971  LeGall .................... 310/112
3,670,190  6/1972  Goebel .................... 310/60
4,164,852  8/1979  Anzalone .................... 310/112

FOREIGN PATENT DOCUMENTS

2295612  6/1974  France .................... 310/114
36245  11/1979  Japan .

*Primary Examiner*—J. D. Miller
*Assistant Examiner*—D. L. Rebsch
*Attorney, Agent, or Firm*—Wenderoth, Lind & Ponack

[57] ABSTRACT

An electric generator for a vehicle has a rotary generator shaft, a generator rotor mounted on the shaft and having a field winding, a bracket surrounding the generator rotor and having the generator shaft rotatably journalled therein, an inductor fixed to the bracket means and having an energizing coil with a plurality of poles, and an induced member rotatably mounted on the rotary generator shaft and opposed to the inductor with a minute gap therebetween, so as to be coupled to the inductor by an electromagnetic force when the energizing coil receives current from the generator. The generator stator is disposed around the generator rotor and has an armature winding with a number of poles exceeding twice the number of poles of the inductor and for generating an AC output usable for supplying power to a load outside the generator. The energizing coil is connected to the armature winding for receiving a part of the AC output for energizing the energizing coil. A cooling fan is integrally connected with the induced member and directs a cooling air flow over the generator.

7 Claims, 10 Drawing Figures

ELECTRIC GENERATOR FOR VEHICLE

TECHNICAL FIELD

This invention relates to an electric generator for a vehicle having an increased cooling airflow obtained by increasing the number of rotations of the cooling fan in order to improve the ability to cool the electric generator.

BACKGROUND ART

Electric generators for vehicles have rotors generally driven by the vehicle engine, and a cooling fan for the electric generator is fixed to this rotor. The airflow from the cooling fan is increased in proportion to the rotational speed. A low rate of electric generation has been unobtainable because a sufficient airflow for cooling the generator cannot be obtained in a region in which the speed of rotation of the engine is low (and therefore in a region of low speed of the electric generator). By raising the ratio of the speed of the electric generator to that of the engine, the airflow can be increased in a low speed region but the cooling fan becomes too noisy to be practical in the high speed region.

As a method of reducing the noise of a cooling fan in a region of high speed of rotation, there are proposed electromagnetic couplings, as disclosed in Japanese laid-open utility model application No. 109,808/1975, but the airflow in the low speed region cannot be increased because the rotary magnetic field is imparted by the rotor of the electric generator.

Figure 1:
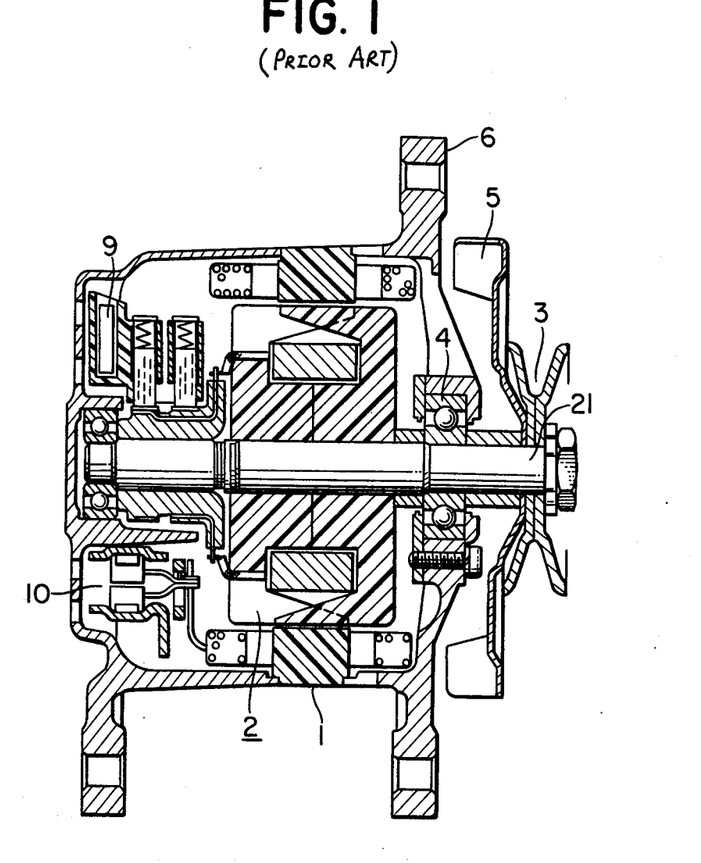
FIG. 1 is a sectional view illustrating a conventional electric generator for a vehicle.

A conventional device of the type referred to will be described with respect to FIGS. 1 and 2. First in FIG. 1 a stator 1 having a three-phase armature winding wound thereon has mounted therein a rotor 2 having a field winding wound thereon which is opposed to the stator across a minute gap in the diametrical direction. A rotary shaft 21 is fixed to this rotor, a pulley 3 is fixed to this rotary shaft, a cooling fan 5 is fixed to the rotary shaft integral with this pulley, a bracket 6 is provided for journalling rotary shaft 21 through a bearing 4, a voltage regulator 9 is provided for holding the output voltage from armature winding 15 constant, and rectifier 10 is provided for rectifying the AC output induced in the armature winding.

As well known, in the conventional device constructed in this way, upon starting the engine, the rotary shaft 21 is driven to rotate the rotor 2. Thus a three-phase AC voltage is induced in the armature winding and that AC voltage is rectified through rectifier 10 and supplied to a battery or a load not shown. Also the output voltage from the armature winding is held at a constant magnitude by means of the voltage regulator.

Also since the cooling fan 5 is rotated with the rotor 2, a cooling airflow is caused to pass through the electric generator to cool it.

However, conventional cooling fan 5 has been disadvantageous in that the airflow is small in the low speed region of the engine and in the high speed region of the engine, the airflow is sufficient but it becomes too noisy.

Figure 2:
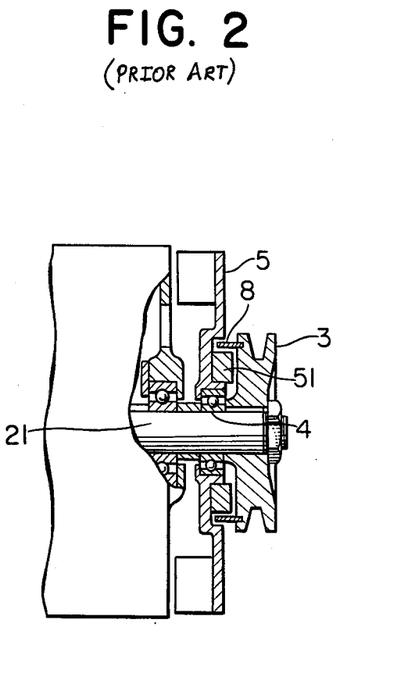
FIG. 2 is a sectional view illustrating another conventional generator.

A conventional device for eliminating this disadvantage is shown in FIG. 2. In FIG. 2 a permanent magnet 51 is provided which functions as an inductor for an electromagnetic coupling and which has adjacent magnetic poles on the perimeter of a circle which are different in polarity from each other, the magnet being fixed to said cooling fan 5. A magnetic plate 8 is mounted on pulley 3 opposed to permanent magnet 51 across a minute gap in the diametrical direction and serves as an induced member for the electromagnetic coupling.

The cooling fan 5 in this conventional example is caused to be freely rotated independently of the rotary shaft 21 and the rotational speed is constant when the torque of the electromagnetic coupling, composed of the permanent magnet 51 forming a rotary magnetic field, with the magnetic plate 8 fixed to the rotor shaft 21, is in accord with the torque due to the air pressure of the cooling fan. This conventional arrangement produces an improvement in the noise of the cooling fan 5 in the high speed region but the airflow from the cooling fan 5 in the low speed range does not increase as compared with the conventional arrangement shown in FIG. 1. Thus it does not reduce temperature.

A further conventional electric generator for a vehicle using a cooling fan having a large outside diameter in order to increase the cooling airflow and which fan is covered by a safety cover will be described in conjunction with FIG. 3.

Figure 3:
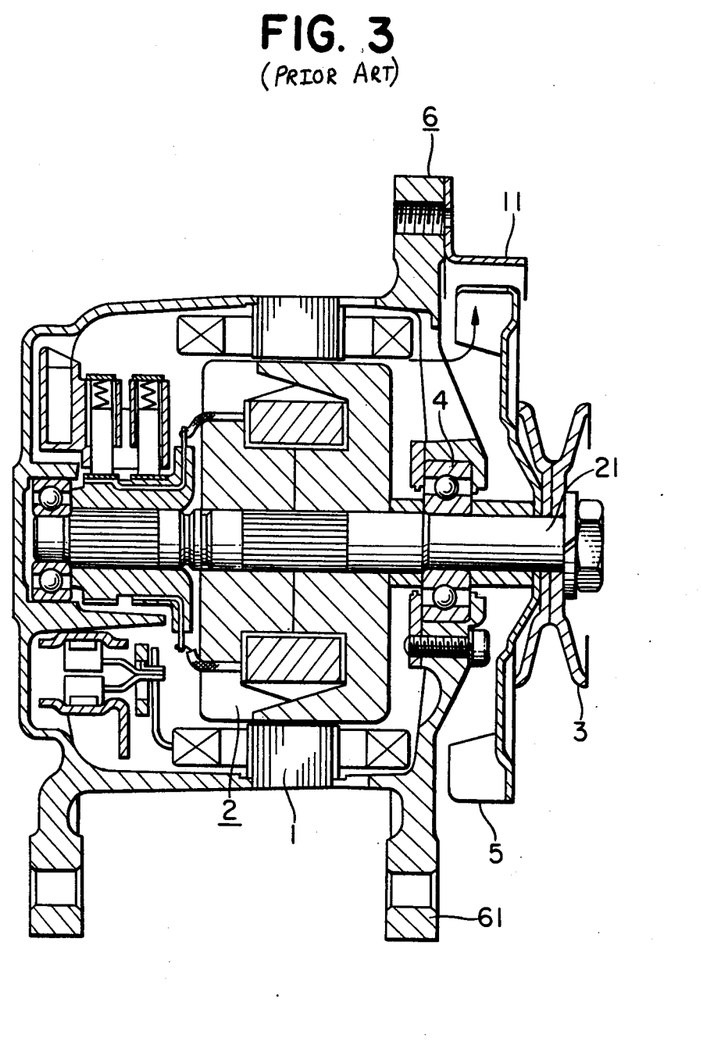
FIG. 3 is a sectional view illustrating still another generator.

In FIG. 3 a stator 1 having a three-phase armature winding has a rotor 2 having a field winding, and a bearing 4. Mounting brackets 61 and 62 are provided on the opposite ends of the stator housing and carry the bearings 4 for rotatably journalling said rotor 2. A cooling fan 5 is fixed to said rotary shaft 21, and a driven pulley 3 is fixed to said rotary shaft 21 along with this cooling fan 5, and a protective cover 11 is fixed to a bracket 6 on the stator housing. The rotor 2 is driven by a not shown engine for a vehicle or the like through the pulley 3 to generate a three-phase AC electric power in the armature coils of the stator 1. Cooling air is moved, as shown by the arrow, by means of the cooling fan 5 for absorbing heat generated in the generator, and the generator is cooled. As will be understood from the Figure, the outside diameter of the cooling fan 5 is larger than that of the stator housing, but as described above, the protective cover 11 has been mounted over the cooling fan 5. This is because such an externally mounted cooling may cause an injury to a person performing the adjusting operation and the like during rotation.

Accordingly, this conventional arrangement has required the protective cover 11 for purposes of safety and thus has the disadvantages that the number of the components is large and the number of the assembling steps increases and the device is large-size.

Figure 4:
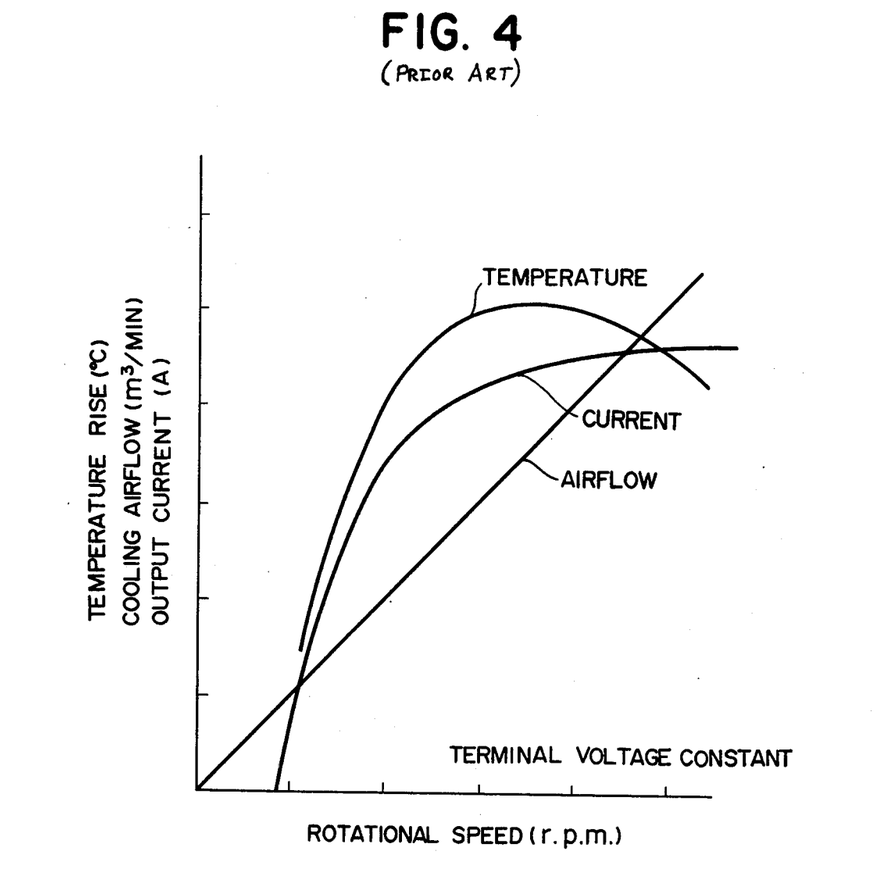
FIG. 4 is a graph showing characteristic curves of the relations of the output from a conventional electric generator for a vehicle, the cooling airflow and the temperature.

FIG. 4 shows the relations of the output current from said conventional electric generator, the airflow from the cooling fan 5 and the temperature rise of the armature winding. The electric generator has the characteristic that the temperature becomes a maximum at about 3000 RPM, but if the airflow is increased, this temperature can be reduced. In the conventional devices, however, the airflow from the cooling fan 5 is not sufficient at a time when the temperature of the electric generator for the vehicle becomes maximum, and the magnitude of the output from the electric generator is thus limited.

DISCLOSURE OF THE INVENTION

The present invention has been made to overcome this problem and provides an electric generator for a vehicle in which the airflow due from a cooling fan is materially increased and a larger output is obtained with the same size apparatus.

BEST MODE FOR CARRYING OUT THE INVENTION

Figure 5:
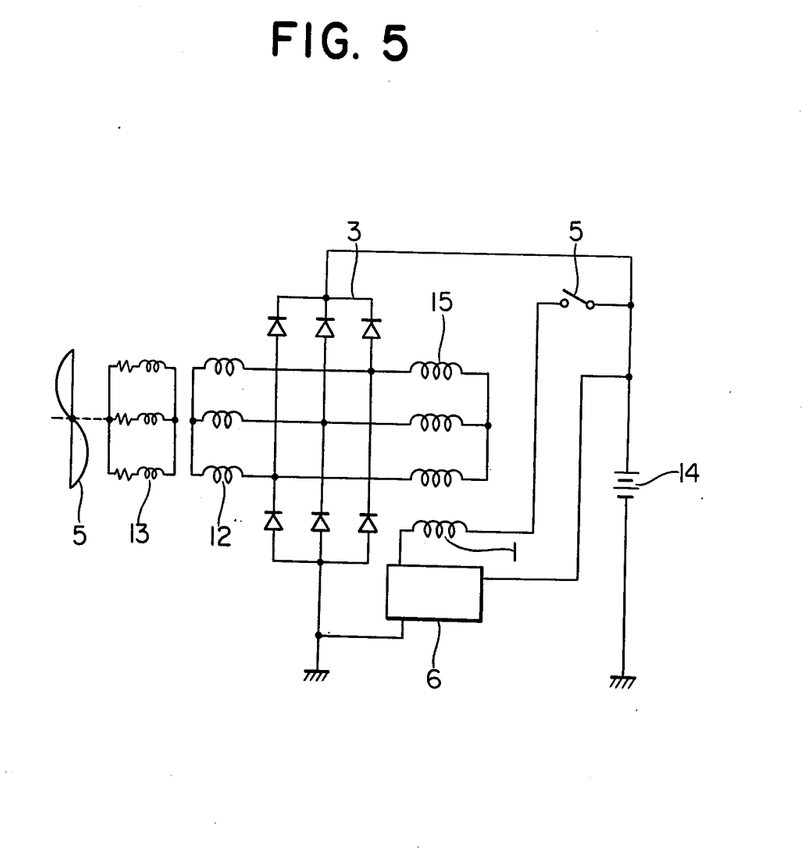
FIG. 5 is a diagram of a configuration of an electric circuit illustrating one embodiment of the present invention.
Figure 6:
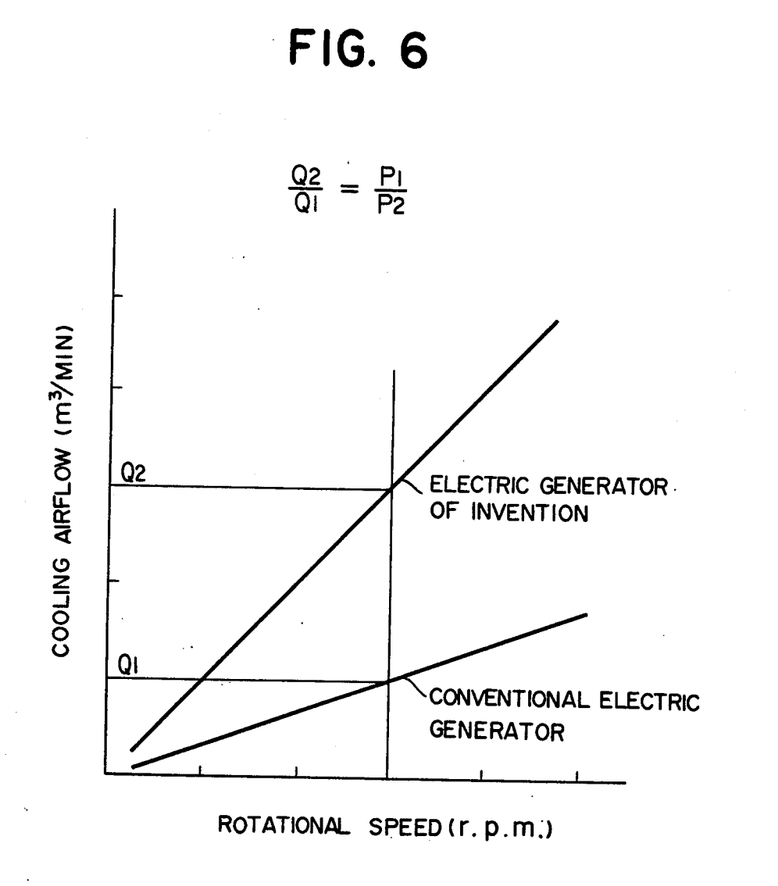
FIG. 6 is a graph of characteristic curves illustrating the increase in airflow from the cooling fan according to the present invention shown in FIG. 5 and a conventional device.

A description will be given of one embodiment of the present invention as shown in FIG. 5 and FIG. 6. As shown diagrammatically in FIG. 5, stator windings 12 of an induction motor are provided around rotor windings 13 of the induction motor which are provided on the shaft fan 5 and are made of aluminum so as to form an eddy current coupling with the stator windings 12.

In operation, when the vehicle engine is started and the AC generator for the vehicle is driven, an output voltage is induced in the armature windings 15 on the stator 1 by the rotor field coil 17 in accordance with the speed of rotation of the rotor and an output voltage of rectifier 10 is supplied to a battery 14 or a load not shown, as in a conventional generator. At the same time, the output voltage induced in armature windings 15 is supplied to the stator windings 12 of the induction motor to energize the magnetic coupling portion. Due to the conduction of the current through this stator winding 12, an eddy current is generated in the eddy current coupling portions of the stator 12 and rotor 13 of the induction motor and the rotor 13 is driven by means of the electromagnetic force resulting from the generation of the eddy currents.

The relationship of the speed of rotation of the rotor 13 of this induction motor and the rotor of the electric generator for the vehicle will be described below.

Assuming that $P_1$ designates the number of poles of the electric generator, the relationship between the synchronous speed $N_1$ in rpm and the frequency $f_1$ in Hz is given by $$N_1 = \frac{120 f_1}{P_1} \text{ (rpm)}$$

Assuming that $P_2$ designates the number of poles of the stator winding 12 of the motor, the relationship between the synchronous speed $N_2$ rpm and the frequency $f_1$ is given by $$N_2 = \frac{120 f_1}{P_2}$$

and accordingly the ratio of the synchronous speed $N_2$ of the electric motor to the synchronous speed $N_1$ of the electric generator is $$N_2 : N_1 = P_1 : P_2$$

Disregarding slip, the speed of rotor 13 of the electric motor is increased by about $P_1/P_2$ times by making the number of poles of the motor less than the number of poles of the generator, so that the airflow from the cooling fan 5 coupled to the rotor 13 is also multiplied by $P_1/P_2$. For example, assuming that the electric generator is composed of 12 poles and the electric motor is composed of 4 poles, the rotor 13 of the electric motor is rotated at a speed equal to about three times that of the rotor of the electric generator. Accordingly a trippled cooling airflow can be provided. FIG. 6 shows the relationship between the airflow in a conventional electric generator for a vehicle and the airflow in the electric generator of the present invention.

In the foregoing, the electric motor driven by part of the current output from the electric generator to drive the cooling fan 5 has been described as utilizing an eddy current coupling, but the coupling of the rotor 13 and stator 12 may be by magnetic members forming a hysteresis coupling.

In the present invention as described above, an electric motor is provided which is supplied with one portion of an AC output from the AC generator to be cooled, and this motor consists of a stator having a number of poles smaller than one half the number of poles of the AC generator, and a rotor magnetically coupled to be driven by the energization of the poles of a stator, has a fan mounted thereon for cooling the electric generator. Thus by choosing the number of poles of the electric generator and that of the electric motor properly, the speed of rotation of the cooling fan can be increased more than that of the electric generator and the airflow from the cooling fan can be increased. By this arrangement, an electric generator which is identical in size to conventional ones provides a large output as compared with the conventional ones.

Figure 7:
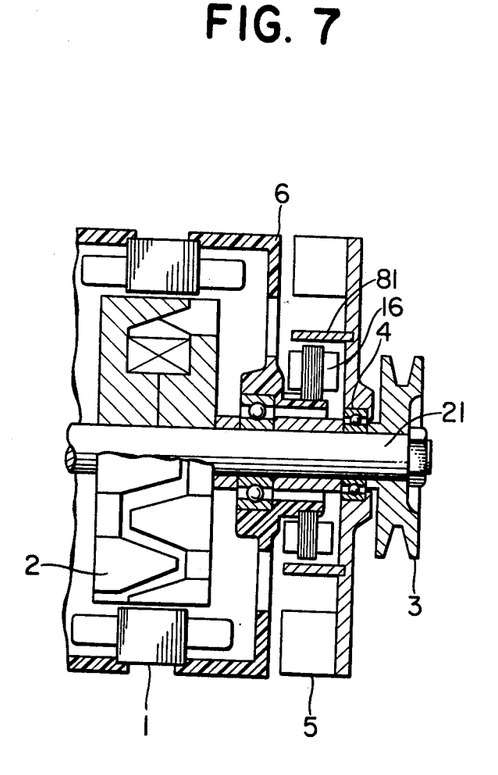
FIG. 7 is a sectional view illustrating another embodiment of the present invention.
Figure 8:
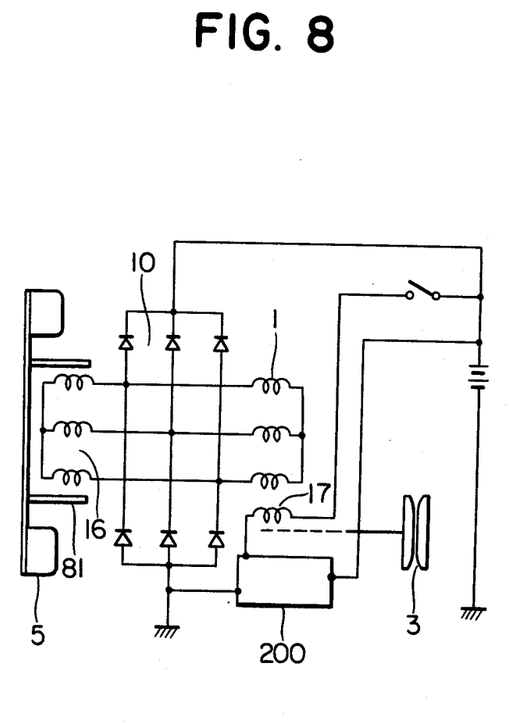
FIG. 8 is an electrical circuit diagram illustrating the embodiment shown in FIG. 7.

Another embodiment of the present invention is shown in FIG. 7 and FIG. 8. In these Figures, a voltage regulator 200 is provided for controlling the conduction of current through the field coil 17 of the rotor 2 of the generator to hold the output voltage from the armature coils 15 of the stator 1 constant, and 16 is a stator which is an inductor forming part of an electromagnetic coupling and has a three-phase winding supplied with current from said armature windings 15 and is fixed to an outer lateral peripheral portion of the bracket 6. An aluminum plate 81 forming an induced member of the electromagnetic coupling is fixed to the cooling fan 5 so as to be opposed to said stator across a minute gap in the diametical direction. In the embodiment constructed as described above, when the pulley 3 is driven by the vehicle engine (not shown) and the rotor 2 is rotated, a three-phase alternating current is generated in the armature windings 15 of the stator 1. The synchronous speed $N_1$ accords with the rotational speed of the rotor 2 and, assuming that $P_1$ designates the number of poles, the synchronous frequency f is given by the following expression:

$$f = \frac{P_1 \times N_1}{120} \text{ (Hz)}$$

Since the windings 15 and 16 are connected electrically by three-phase connections, the synchronous frequency of the inductor is:

$$f = \frac{P_2 \times N_2}{120} \text{ (Hz)}$$

where $P_2$ designates the number of poles of the stator 16 of the inductor. The relationship between the numbers of poles 16 and the synchronous speeds is:

$$\frac{P_1}{P_2} = \frac{N_2}{N_1}$$

That is to say, when the number of poles of the stator 1 and that of the stator 16 of the inductor fixed to the bracket 6 are selected to be 12 and 4 poles, the magnetic field of the stator 16 is rotated at a synchronous speed three times the rotational speed of the rotor 12. Thereby the induced member 81 positioned to be magnetically induced by the second stator 16 generates a torque. Since the torque needed for the airflow from the cooling fan 5 fixed to the induced member 81 is small in the low speed region, little slip occurs, and the rotation is effected at approximately the same speed as the synchronous speed of the stator 16.

The cooling fan 5 is rotated at about three times the rotational speed of the rotor 2 and accordingly about three times the airflow is provided as compared with the conventional electric generator. As the rotational speed of the rotor 2 increases and hence the rotational speed of the cooling fan 5 increases, the load on the cooling fan 5 due to the airflow is increased and the torque is supplied from the induced member 81. At some intermediate speed, the rotational speed of the cooling fan 5 becomes constant due to slippage between stator 16 and induced member 81. Accordingly, even though the rotation of the rotor 2 reaches a high speed, the noise of the cooling fan 5 becomes constant at an intermediate speed.

In the foregoing there has been exemplified coupling means which utilizes eddy current coupling and in which the operating current is one portion of the three-phase AC output from the AC generator for the vehicle, but the induced member may be a magnetic member utilizing hysteresis coupling to drive it.

When the cooling fan according to the present invention is utilized as described above, it becomes possible to sharply increase the airflow in the low speed region and therefore it is possible to absorb a large amount of generated heat with a generator and fan structure of ordinary size. For example a fan speed twice the conventional can be obtained from a conventional electric generator. Furthermore, there is the advantage that noise due to the rotation of the cooling fan at high speeds can be reduced to a constant level.

Also the inductor of the conventional prior art electromagnetic coupling has been required to have a magnetic field to maintain the rotation of the induced member in a 1 to 1 relationship, which requires a rather large magnet in order to provide the required torque. On the contrary, the inductor according to the present invention uses a portion of the AC output from the electric generator for the vehicle and by selecting the appropriate number of poles, a speed of rotation which is an integral multiple of the speed of the generator can be freely obtained.

Figure 9:
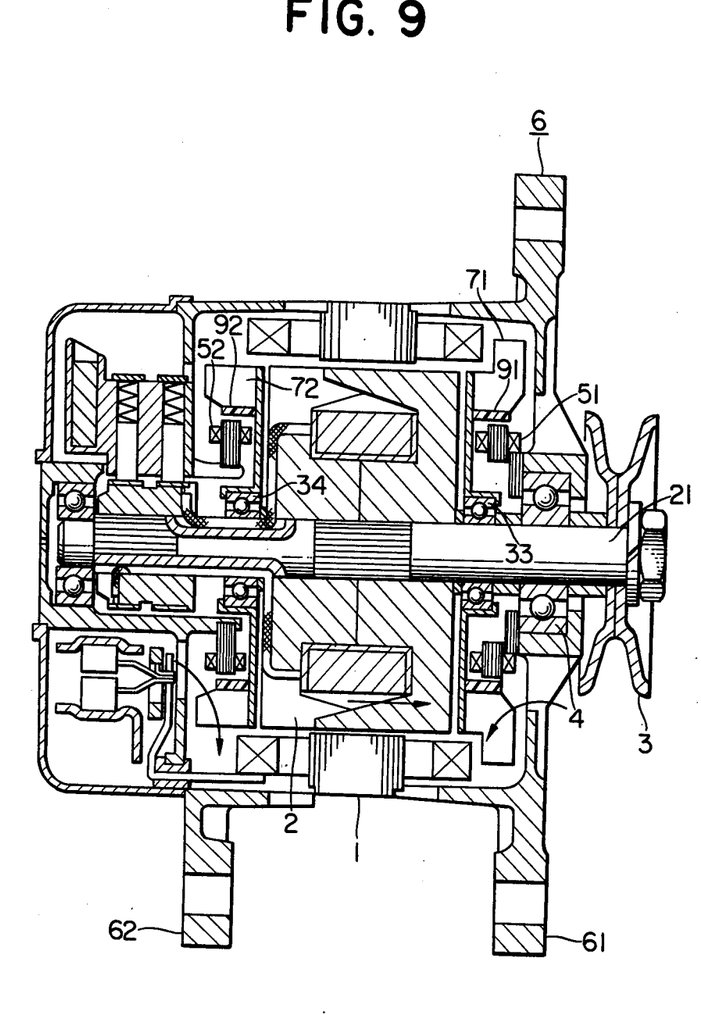
FIG. 9 is a sectional view illustrating still another embodiment of the present invention.
Figure 10:
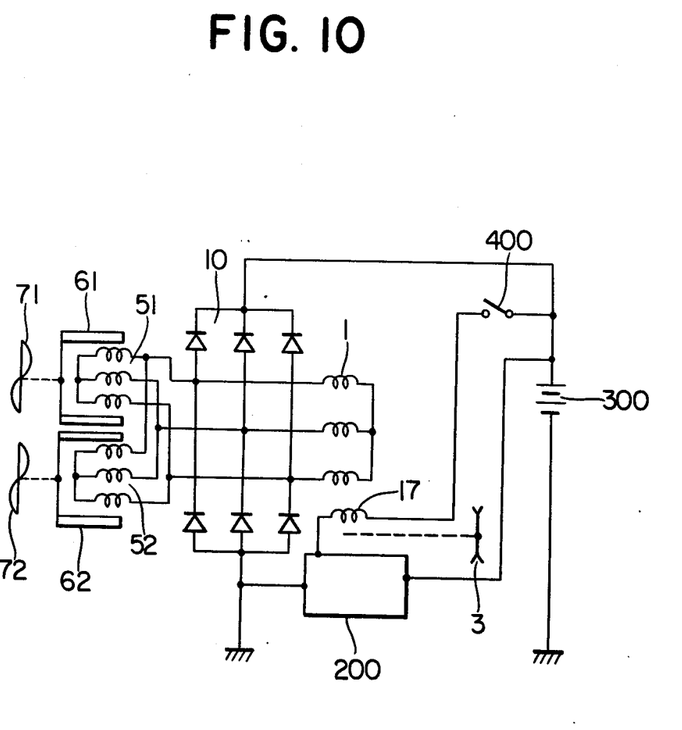
FIG. 10 is an electrical circuit diagram illustrating the embodiment shown in FIG. 9.

A description will be given of still another embodiment of the present invention as shown in FIG. 9 and FIG. 10.

In the Figures, 511 and 521 are a first and a second winding fixed to the ends of the stator housing carrying the brackets 61 and 62 respectively, these windings being three-phase windings and constituting inductors, the winding carrying part of the AC output from said electric generator to be energized. First and second induced members 91 and 92 are in spaced opposed relation to said inductors across minute gaps in the diametrical direction and are made of aluminum, so as to constitute eddy current couplings with said inductors. First and second cooling fans 71 and 72 are integrally fixed to said first and second induced members 91 and 92, and bearings 33 and 34 rotatably journal said induced members 91 and 92 on the rotary shaft 21. The apparatus has a rectifier 10 for rectifying the AC output from the armature coil of said stator 1, a voltage regulator 200 for controlling current to the field coil 17 of said rotor 2, to hold the output voltage from said armature coil constant, a storage battery 300 and a key switch 400. When the rotor 2 is driven from the pulley 3, a three-phase alternating current is generated on the stator 1 and the first and second three-phase windings 511 and 521, electrically connected to the field coils 15 of the stator 1, are supplied with a three-phase electric power to generate a rotary magnetic field. Eddy current couplings are produced between the inductors 511 and 521 and the induced members 91 and 92 to drive the induced members 91 and 92 by means of an electromagnetic force. By selecting the number of poles of the armature winding of the electric generator to be 12 poles and causing the first and second windings 511 and 521 of the inductors to have 4 poles, for example, the synchronous speed of the rotary magnetic field of the inductors becomes three times the synchronous speed of the generator. Accordingly, the first and second induced members 91 and 92 are driven at three times the synchronous speed of the rotor 1 of the electric generator and are rotated at the trippled speed, disregarging slip. The cooling fans 71 and 72 coupled thereto can thus deliver an airflow about three times that of the cooling fan of conventional electric generators. Accordingly, even though the cooling fans have such a small outside diameter that they are entirely within the periphery of the brackets 61 and 62, they can provide airflows larger than those from cooling fans which are large enough to project outside the peripheries of the brackets 61 and 62. As a result, the protective cover 11 previously required for such large size fans is not necessary, and the space around the engine for the vehicle can be more effectively utilized.

The output from the electric generator is generally proportional to the magnitude of a magnetomotive force of the rotor 2, but the resistance of the field coil required for generating this magnetomotive force becomes large due to the generation of heat, which in turn causes a decrease to the field current and accordingly the magnetomotive force is attenuated. In order to keep this attenuation small, it is necessary to cause a flow of cooling air to be applied to the surface of the rotor 2.

For example, if the number of poles of the first winding 511 in the inducer is selected to be small as compared with that of the second winding 521, then the first cooling fan 71 is rotated at a speed higher than that of the second cooling fan 72 so that the difference in air pressure between opposite ends of the rotor 2 becomes large as compared with conventional electric generators. Accordingly, the cooling airflow passing along the outer peripheral surface of the rotor 2 increases. Thus the attenuation of the magnetomotive force can be kept small.

In the foregoing, there has been described means utilizing an eddy current coupling as the means operated by one portion of the output from the AC generator for the vehicle to drive the cooling fan 7. However, the induced members 61 and 62 may be magnetic members forming part of a hysteresis coupling.

Also in the foregoing description there has been described a construction by which the two cooling fans 71 and 72 are independently rotated. However, either one of the cooling fans could be fixed to the rotary shaft 21, and considerably improved cooling would still be obtained.

As described above, the present invention provides an inductor fixed within the periphery of a bracket and having an energizing coil with a plurality of poles, an induced member rotatably disposed on a rotary shaft opposed to this inductor across a minute gap, the inductor and induced member being coupled to each other by an electromagnetic force when the energizing coil is supplied with power, a stator disposed around a rotor and having an armature winding with a number of poles exceeding twice the number of poles of the inductor and for generating an AC output, part of which is supplied to the energizing coil, and a cooling fan integral with the induced member and also lying within the periphery of the bracket. Thus without enlarging the size of the cooling fan for cooling the rotor of an electric generator in any way, it can be accomodated within the profile of the bracket. Thus a protective cover such as used in the prior art practice is made unnecessary. Moreover, the cooling fan can provide a sufficient airflow so that the small space around the engine can be effectively utilized and a large output can be obtained.

INDUSTRIAL APPLICABILITY

The present invention is applicable to an air cooled type electric generator provided on a vehicle.

We claim:
1. An electric generator for a vehicle comprising:
    a generator rotor and a generator stator around said rotor, said generator having a first number of poles and having AC output windings in said stator for producing an AC output usable for supplying power to a load outside the generator;
    an electric motor consisting of a motor stator having a second number of poles smaller than one half said first number of poles and a motor rotor rotatably mounted relative to said motor stator and magnetically coupled thereto for being driven by energization of the stator, said motor stator being electrically connected to said output windings of said generator stator for receiving part of the AC output from said generator; and
    a fan fixed to the motor rotor and directed for causing a cooling air flow to flow over the generator for cooling the generator.

2. An electric generator as claimed in claim 1 in which the motor rotor is made of an electrically conducting material.

3. An electric generator as claimed in claim 2 in which said electrically conducting material is aluminum.

4. An electric generator as claimed in claim 1 in which the motor rotor is made of a magnetic material.

5. An electric generator as claimed in claim 1 in which said generator rotor has twelve poles and said motor stator has four poles for causing the speed of said cooling fan to be higher than the speed of said generator rotor.

6. An electric generator for a vehicle comprising:
    a rotary generator shaft;
    a generator rotor mounted on said generator shaft and having a field winding;
    a bracket means surrounding said generator rotor and having said generator shaft rotatably journalled therein;
    an inductor fixed to said bracket means and having an energizing coil with a plurality of poles;
    an induced member rotatably mounted on said rotary generator shaft and opposed to said inductor with a minute gap therebetween for being coupled to said inductor by an electromagnetic force when said energizing coil is energized;
    a generator stator disposed around said generator rotor and having an armature winding with a number of poles exceeding twice the number of poles of said inductor and for generating an AC output usable for supplying power to a load outside said generator, said energizing coil being connected to said armature winding for receiving a part of the AC output for energizing said energizing coil; and
    a cooling fan integrally connected with said induced member and directed for causing a cooling air flow to flow over the generator for cooling the generator.

7. An electric generator as claimed in claim 6 in which said inductor has a diametrical dimension less than that of the bracket means and said cooling fan also has a diametrical dimension less than that of the bracket means, whereby the cooling fan is within the peripheral profile of said bracket means.

* * * * *